United States Patent [19]

Grachian et al.

[11] 3,793,036

[45] Feb. 19, 1974

[54] METHOD OF PRODUCING RAPID-HARDENING CEMENT

[76] Inventors: Ashot Natanovich Grachian, ulitsa Pushkinskaya, 68, kv. 54; Pavel Petrovich Gaidzhurov, ulitsa Budennovskaya, 183, kv. 33; Georgy Sergeevich Zubar, ulitsa Zhdanova, 104, kv. 3; Valentina Vladimirovna Borodavkina, ulitsa Galiny Petrovoi, 16, all of Novocherkassk; Vladimir Sergeevich Dmitrievsky, ulitsa Studencheskaya, 31, kv. 21; Vladimir Mikhailovich Ozerov, ulitsa Svobody, 59, kv. 12, both of Voronezh; Naum Aronovich Yarkno, Vtoraya Brestaskaya, 43, kv. 59, Moscow, all of U.S.S.R.

[22] Filed: Jan. 13, 1972

[21] Appl. No.: 217,644

[30] Foreign Application Priority Data
Jan. 13, 1971 U.S.S.R............................. 1608709

[52] U.S. Cl. .............................................. 106/100
[51] Int. Cl. .......................... C04b 7/02, C04b 7/22
[58] Field of Search ..................................... 106/100

[56] References Cited
UNITED STATES PATENTS

| | | | |
|---|---|---|---|
| 806,146 | 12/1905 | Hurry et al. | 106/100 |
| 806,161 | 12/1905 | Michaelis | 106/100 |
| 1,586,099 | 5/1926 | Martin | 106/100 |
| 3,194,673 | 7/1965 | Schedel | 106/100 |

Primary Examiner—James E. Poer
Assistant Examiner—S. Berger
Attorney, Agent, or Firm—Holman & Stern

[57] ABSTRACT

A method of producing rapid-hardening cement, characterized by the use of a mixture of raw materials, comprising from about 27 to about 42 weight percent of iron oxides, said mixture being roasted at a temperature of 980° to 1050°C in a reducing medium.

3 Claims, No Drawings

METHOD OF PRODUCING RAPID-HARDENING CEMENT

The present invention relates to a method of producing a binder for pelletizing ores without roasting, and more particularly to a method of producing rapid-hardening cement.

Rapid-hardening cement is a very promising binder for use in the process of pelletizing dust ore materials without roasting, the latter process having found wide application in present-day metallurgy. Besides high mechanical properties, such binders must feature enhanced rapidity of hardening.

The present-art rapid-hardening cements are produced by roasting a mixture of raw materials, which contains up to 3.5 percent of iron oxides and consists, mainly, of clay and lime components, the roasting of said mixture being carried out in a conventional oxidizing medium ($CO+H_2=O$) at a temperature of 1,450°C.

These cements, however, exhibit rapid-hardening properties only in combination with such fillers as sand, gravel, etc. In the process of ore pelletizing the rate of hardening of cements becomes deteriorated, since ore particles are fully inert and do not participate in the hydration process from the surface.

Conventional rapid-hardening cements contain considerable quantities of silica (their silica modulus ranging from 3.2 to 3.5). Therefore, additional amounts of silica introduced with cement into the charge for the pelletizing of ores bring about a reduction in the total content of iron in these ores and, hence, an increased consumption of fuel required for running metallurgical processes.

It is an object of the present invention to provide a method of producing rapid-hardening cement, which will ensure the obtaining of cement with an enhanced rapidity of hardening, so that it can be applicable for pelletizing ores without roasting thereof, and without any material reduction in the content of iron oxides in the charge employed for the pelletizing of ores.

The said and other objects are accomplished by providing that in the present method of producing rapid-hardening cement by roasting a mixture of raw materials, according to the invention, use is made of a mixture comprising from about 27 to about 42 weight percent of iron oxides, the mixture being roasted in a reducing medium at a temperature ranging from 980° to 1,050°C, with the content of reducing agents being from 15 to 20 percent.

The present invention is carried out as follows:

The content of iron oxides in the mixture of raw materials of from about 27 to about 42 weight percent allows a reduction in the content of silica in cement. The addition of such cement to the ore will not affect the content of iron oxides in the resulting charge to be employed for ore pelletizing.

A low roasting temperature (up to 1,050°C) precludes the possibility of formation of saturated calcium aluminates and calcium silicates which are slower to harden than calcium monoaluminates and silicates. At a temperature of up to 1,050°C high-basicity calcium ferrites are formed whose hydraulic activity is comparable to that of calcium monoaluminates.

The reducing conditions of the roasting process contribute to the formation of finely dispersed metallic iron, low-basicity calcium aluminates and silicates, and high-basicity calcium ferrites. The reduced finely dispersed active metallic iron and bivalent iron oxides catalyze the hydration process, thus contributing to rapid setting and hardening of the cement.

The iron-containing phase of the cement forms colloidal solutions of iron hydroxide, which, due to their good contact with the surfaces of ore particles, ensure reliable agglomeration of the latter.

Due to its high mechanical strength, the rapid-hardening cement produced by the method of the present invention enables the preparation of ore pellets by granulating the charge, without its subsequent roasting for strengthening.

The cement produced by the present method is an air-hardening binder.

For a better understanding of the present invention, described below are illustrative embodiments of the present method.

A mixture of raw materials was prepared by dry grinding limestone and ore simultaneously.

The chemical composition of the limestone (in weight percent) was as follows:

| | |
|---|---|
| $SiO_2$ | 1.5 |
| $Al_2O_3$ | 0.07 |
| $Fe_2O_3$ | 0.77 |
| CaO | 55.09 |
| $SO_3 + P_2O_5$ | 0.02 |
| Loss of roasting | 42.55 |

The chemical composition of the ore (in weight percent):

| | |
|---|---|
| $SiO_2$ | 10.15 |
| $Al_2O_3$ | 4.03 |
| $Fe_2O_3$ | 68.09 |
| CaO | 1.75 |
| MgO | 0.14 |
| $SO_3 + P_2O_5$ | 1.73 |
| $TiO_2$ | 0.23 |
| Loss of roasting | 14.07 |

The mixture of raw materials was roasted in a cyclone kiln at a temperature of 980° to 1,050°C in a reducing medium. The reducing medium for the roasting process was created by introducing into the mixture up to 5 percent of ashless coal and from 15 to 20 percent of reducing agents (a mixture of carbon monoxide and hydrogen) fed into the working space of the kiln. In the course of roasting the temperature of the material being roasted and the content of the reducing agents in flue gases were controlled.

The resulting clinker was ground down to a specific surface of from 2,800 to 3,000 cm²/g. For preparing pellets, the rapid-hardening cement was introduced into dust ore in an amount of up to 15 percent, and the composition was thoroughly mixed. The resulting charge was then granulated.

The roasting conditions for the mixture of raw materials vary, depending on its composition, as can be seen from the tables given hereinbelow. Listed in Table 1 are compositions of the mixture, while Table 2 presents the properties of the rapid-hardening cement produced.

TABLE 1

| Example No. | Components of mixture of raw materials | Ratio between components, wt. pts. | Chemical composition, in weight percent | | | | | | | |
|---|---|---|---|---|---|---|---|---|---|---|
| | | | $SiO_2$ | $Al_2O_3$ | $Fe_2O_3$ | CaO | MgO | $SO_3 + P_2O_5$ | $TiO_2$ | Loss of roasting |
| 1 | Ore | 3 | 6.09 | 2.39 | 40.86 | 0.96 | 0.08 | 1.04 | 0.14 | 8.44 |
| | Limestone | 2 | 0.60 | 0.04 | 0.31 | 22.01 | — | 0.01 | — | 17.03 |
| | Raw mixture | | 6.69 | 2.43 | 41.17 | 22.97 | 0.09 | 1.05 | 0.14 | 25.07 |
| 2 | Ore | 2.5 | 5.07 | 1.99 | 34.05 | 0.80 | 0.07 | 0.86 | 0.12 | 7.04 |
| | Limestone | 2.5 | 0.75 | 0.04 | 0.38 | 27.55 | — | 0.01 | — | 21.27 |
| | Raw mixture | | 5.82 | 2.03 | 34.43 | 28.35 | 0.07 | 0.87 | 0.12 | 28.31 |
| 3 | Ore | 2 | 4.06 | 1.60 | 27.24 | 0.64 | 0.05 | 0.69 | 0.09 | 5.63 |
| | Limestone | 3 | 0.90 | 0.04 | 0.46 | 33.06 | — | 0.01 | — | 25.63 |
| | Raw mixture | | 4.96 | 1.64 | 27.70 | 33.70 | 0.05 | 0.70 | 0.09 | 31.16 |

TABLE 2

| Example No. | Silica modulus | Alumina modulus | Percent age of reducing agents, ($CO+H_2$) | Temperature of roasting raw mixture, °C | Change in percentage of iron oxides in pellets as compared to ore | Setting time, min. | Compression strength, $kg/cm^2$ (days) | | | |
|---|---|---|---|---|---|---|---|---|---|---|
| | | | | | | | 0.5 | 1 | 3 | 7 |
| 1 | 0.016 | 0.06 | 20 | 980 | +1.73 | 17 | 87 | 90 | 96 | 102 |
| 2 | 0.016 | 0.06 | 17 | 1020 | −0.3 | 15 | 108 | 120 | 130 | 145 |
| 3 | 0.017 | 0.06 | 15 | 1050 | −2.5 | 14 | 90 | 101 | 110 | 120 |

As can be from the above Table, the cement produced in accordance with the present method is noted for a shorter setting time (14 to 17 minutes) as compared with conventional rapid-hardening Portland cement (whose hardening commences after a period of 45 minutes). In addition, the content of iron oxides in the pellet changes but insignificantly as compared with their content in the ore, the difference being only within a range from +1.73 to −2.5 percent.

We claim:

1. A method of producing rapid-hardening cement which comprises roasting a mixture of raw materials comprising from 2 to 3 parts by weight of iron ore and from 3 to 2 parts by weight of limestone, the mixture containing from about 27 to about 42 weight percent of iron oxides, at a temperature ranging from 980° to 1,050°C in a reducing medium, the content of reducing agents introduced to create the reducing medium being in an amount of from 15 to 20 percent by weight of the mixture.

2. The method of claim 1 wherein the reducing agents comprise a mixture of carbon monoxide and hydrogen.

3. The method of claim 2 wherein there is additionally introduced to create the reducing medium up to 5 percent, by weight of the mixture, of ashless coal.

* * * * *